Patented Feb. 20, 1945

2,369,846

UNITED STATES PATENT OFFICE 2,369,846

PECTIN PREPARATION

Aksel G. Olsen and Ellis R. Fehlberg, Battle Creek, Mich., assignors to General Foods Corporation, New York, N. Y., a corporation of Delaware No Drawing. Application May 1, 1939,
Serial No. 271,161

3 Claims. (Cl. 99—139)

This invention pertains to a powdered preparation containing pectin and adapted to form a gel in the presence of milk.

Pectin is commonly used to prepare jellies. Necessary additional ingredients in such jellies, as recognized in the art, are sugar and acid, although in experimental work other substances as for instance glycerine, have been used to replace the sugar. Ordinary commercial pectins require the presence of large amounts of sugar in the jelly composition and in commercial practice it is customary to employ in the neighborhood of 60% sugar or more in the finished jelly in order to obtain a proper set.

Many attempts have been made to use milk along with pectin but jellies have not been obtained except when other ingredients, as for instance agar, have been added to cause the mixture to set. This is because of the well known fact that pectin as commonly available in the trade reacts with milk to produce a fine curd. This reaction has been described and the theory thereof discussed by G. H. Joseph in the British J. Soc. Chem. Ind., March 21, 1930, and use of the curdling effect for preparing a finely divided soluble dry milk preparation has been proposed in U. S. Patent No. 1,940,036.

We have discovered that curdling can be avoided and that a novel milk product can be obtained by the use of the proper type of pectin which forms with milk a very smooth, uniform, firm gel. The gel thus obtained has many advantages over jellies or puddings obtained by adding such substances as starch or gelatin to milk or such as depend on the addition of rennin. It also has the advantage over customary pectin jellies that no sugar is necessary to obtain set and that therefore the amount of sugar can be controlled solely according to the purposes for which the gel is to be used.

U. S. Patent No. 2,132,577 describes a method for the controlled treatment of pectin-containing raw materials, whereby pectin products may be obtained which have properties intermediate between ordinary commercial pectins and pectic acid. In such products the proportion of free acid groups is progressively increased as the treatment time is prolonged, the increase being readily measured by the determination of the equivalent or combining weight of the pectin in accordance with the following procedure.

A ten gram sample of the treated pectin is suspended in 60% alcohol containing 5% concentrated HCl by volume and stirred for ten minutes, using sufficient solution to make a thin slurry. The slurry is then transferred to a Büchner funnel and the pectin washed with the acid-alcohol solution until no more color is removed and the spent liquor shows no test for metallic ion. Then the pectin is washed with 60% alcohol until the spent liquor shows no test for chlorides with silver nitrate. After one wash with 95% alcohol, the pectin is first air-dried, then vacuum dried for 16 hours at 60°–65° C.

After vacuum drying, the sample is cooled in a desiccator and three one gram samples are weighed out and transferred to 400 cc. beakers. Each sample is wetted by the addition of 2 cc. of alcohol, and 150 cc. of distilled water are quickly added to each with constant stirring to bring the pectin into solution, heating being resorted to if necessary. The solutions are then diluted by the addition of 150 cc. of distilled water and cooled to room temperature, after which they are titrated with standardized N/10 NaOH to a faint pink, using phenolphthalein as the indicator.

The equivalent weight of each sample is calculated as follows:

$$\frac{1000}{\text{Ccs. of alkali} \times \text{normality}} = \text{eq. wt.}$$

The relationship of pickling time and equivalent weight of pectins treated in accordance with the procedure of the above mentioned Patent No. 2,132,577 to their suitability for use with milk is shown in the following table:

| Pickling time, hours | Combining weight | Effect on milk |
|---|---|---|
| 5 | 700 | Curdles. |
| 10 | 650 | Do. |
| 20 | 550 | Do. |
| 30 | 490 | Do. |
| 50 | 415 | Do. |
| 60 | 390 | Poor jelly. |
| 70 | 352 | Fair jelly. |
| 90 | 319 | Firm jelly. |
| 140 | 290 | Do. |

This shows that below a combining weight of 400, pectin begins to acquire special characteristics which make it possible to prepare new and novel pectin-milk products having very desirable properties. Among such products may be mentioned dessert mixtures, puddings, pie fillings, pharmaceutical gels, etc.

As an illustration of the invention, the following example of a dry dessert mixture for the preparation of milk puddings is given:

Chocolate milk pudding A

| | |
|---|---|
| Cocoa grams | 7.8 |
| Sugar do | 34.1 |
| Salt do | 0.5 |
| Vanilla extract cc | 1.0 |
| Pectin (combining weight about 320) grams | 1.2 |

The pudding or jelly is prepared by heating 1 cup of milk to scalding temperature and stirring in the dry mixture given above. The milk is then brought to a boil. The ingredients dissolve without any apparent thickening or curdling, and when poured into glasses to cool result in a smooth, firm, yet elastic jelly which is very palatable, and which shows no tendency to soften at normal summer temperatures. Moreover the jelly exhibits very little tendency towards syneresis. Similar preparations have also been made with other flavors substituted for the cocoa, such as for instance raspberry, butterscotch, plain vanilla, etc.

Another example of the use of this pectin is in connection with preparations containing powdered milk and therefore requiring only the addition of water. A suitable formula for such a preparation is the following:

*Chocolate milk pudding B*

| | |
|---|---|
| Cocoa | grams 7.8 |
| Sugar | do 34.1 |
| Salt | do 0.5 |
| Vanilla extract | cc 1.0 |
| Milk powder | grams 25 |
| Pectin (combining weight about 320) | do 1.2 |

These ingredients are dissolved in one cup of boiling water, and upon cooling a firm jelly of smooth consistency is obtained.

As illustrations of sugarless mixtures embodying the invention may be mentioned the following pie filling and therapeutic preparations:

*Pie filling*

| | Grams |
|---|---|
| Milk powder | 25 |
| Pectin (combining weight about 320) | 2 |

*Therapeutic preparation*

| | Grams |
|---|---|
| Milk powder | 25 |
| Pectin (combining weight about 320) | 4.5 |

In each of the above cases, the ingredients may be dissolved in one cup of boiling water, and upon cooling a firm jelly will be obtained. Of course, both of these preparations may be flavored if desired.

It is to be understood that these examples are given to show the general principle and that the amounts of each ingredient and the kind of flavoring used can be varied to suit individual preferences as to flavor and firmness of jellies. Equally satisfactory results have been obtained with other flavors such as raspberry, butterscotch, vanilla and the like. Similarly, the amount of sugar employed may be varied to suit individual taste preferences or where taste is not a consideration may be omitted altogether. It should also be understood that while we prefer to use a pectin having a combining weight of about 320 the useful range is quite wide and includes all pectins having equivalent weights between about 400 and 210. Furthermore, it is to be understood that while we prefer to prepare pectins suitable for purposes of the present invention by the method described in the above mentioned U. S. Patent No. 2,132,577, any other pectin having the desired characteristics, that is a combining weight of between 400 and 210 may be used.

The term "milk" as used in the appended claims is to be understood as including whole or skimmed fluid milk, cream, evaporated or condensed milk, and milk reconstituted from milk solids and water.

What is claimed is:

1. A milk jelly powder capable of forming a smooth custard-like jelly in the presence of milk without as well as with the addition of sugar, said jelly powder comprising as the jellifying ingredient a methylated pectin having a combining weight of between 400 and 210.

2. A milk jelly powder capable of forming a smooth custard-like jelly upon the addition of water without as well as with the addition of sugar, said jelly powder comprising milk solids and a pectin having a combining weight of between 400 and 210.

3. A smooth custard-like milk jelly the jellifying ingredients of which consist of milk and a pectin having a combining weight of between 400 and 210 and which jellifying ingredients form a jelly independently of the presence of sugar.

AKSEL G. OLSEN.
ELLIS R. FEHLBERG.